E. G. BLACKERT.
CARBURETER.
APPLICATION FILED SEPT. 19, 1912.
1,122,572.
Patented Dec. 29, 1914.
3 SHEETS—SHEET 1.
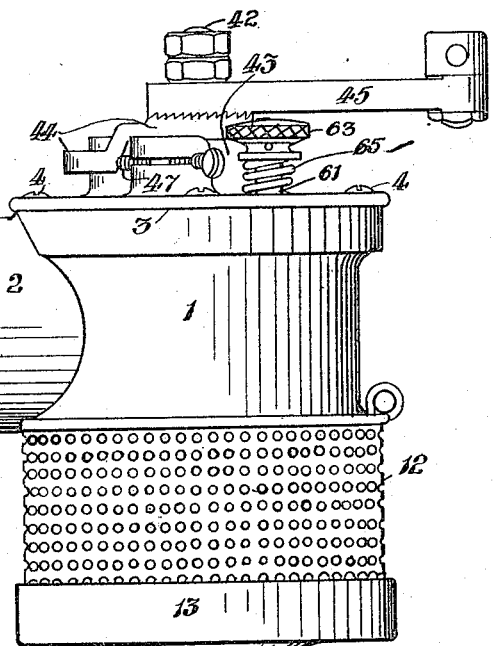
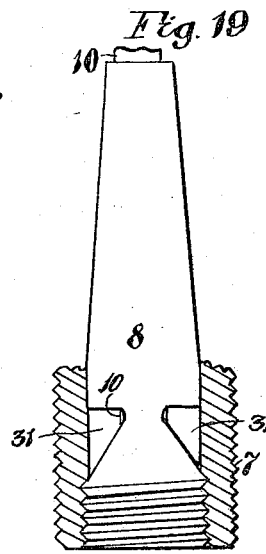
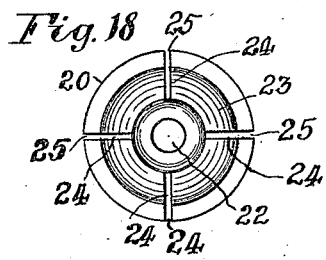
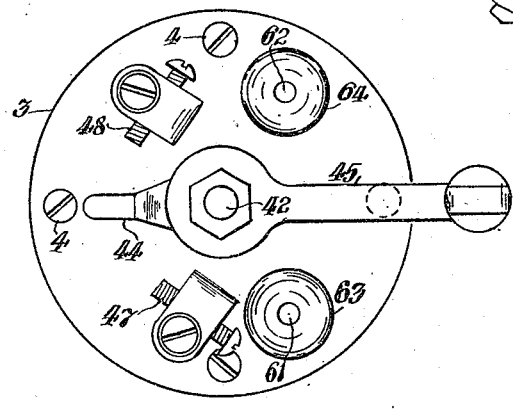
WITNESSES:
INVENTOR
Edward G. Blackert
BY Geo. D. Phillips
his ATTORNEY E. G. BLACKERT.
CARBURETER.
APPLICATION FILED SEPT. 19, 1912.
1,122,572.
Patented Dec. 29, 1914.
3 SHEETS—SHEET 2.
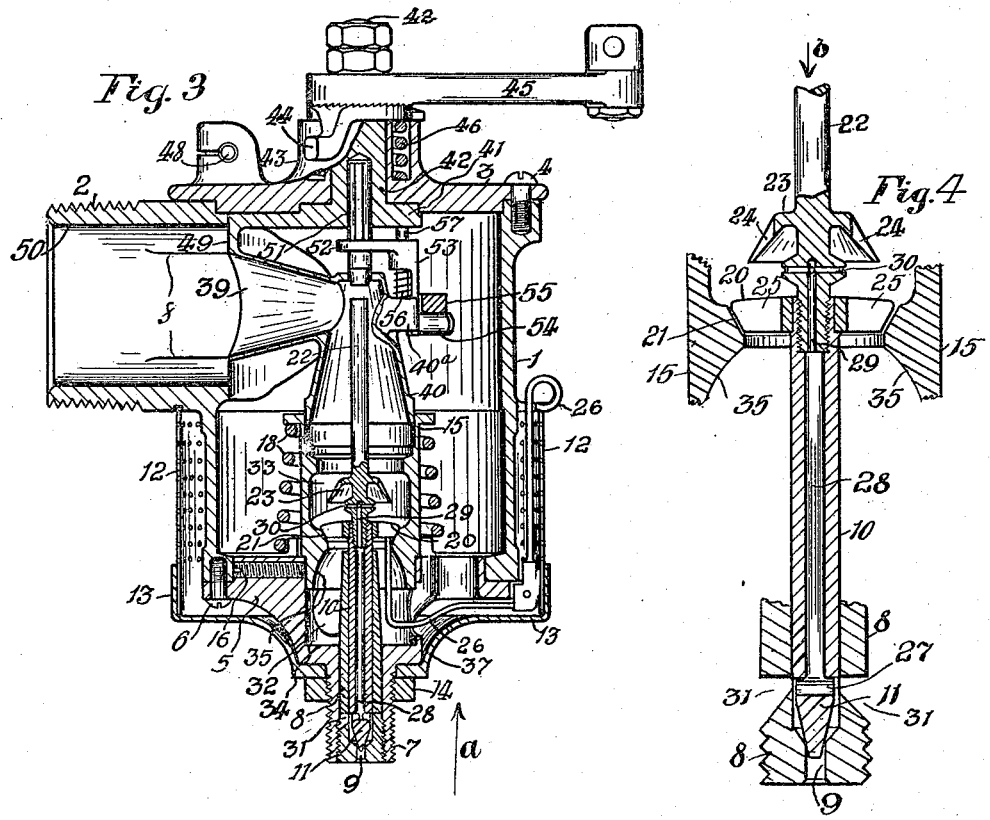
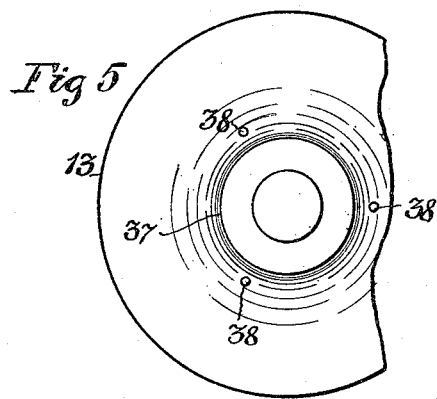
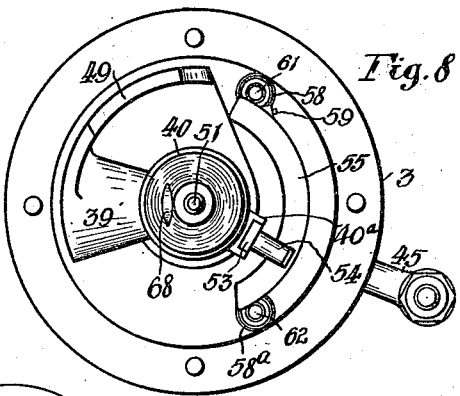
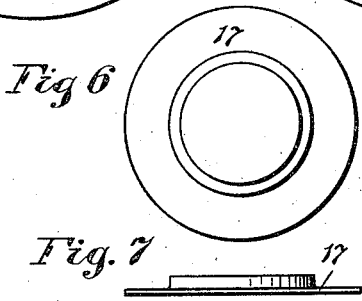
WITNESSES:
INVENTOR
Edward G. Blackert
BY Geo. D. Phillips
his ATTORNEY E. G. BLACKERT.
CARBURETER.
APPLICATION FILED SEPT. 19, 1912.
1,122,572.
Patented Dec. 29, 1914.
3 SHEETS—SHEET 3.
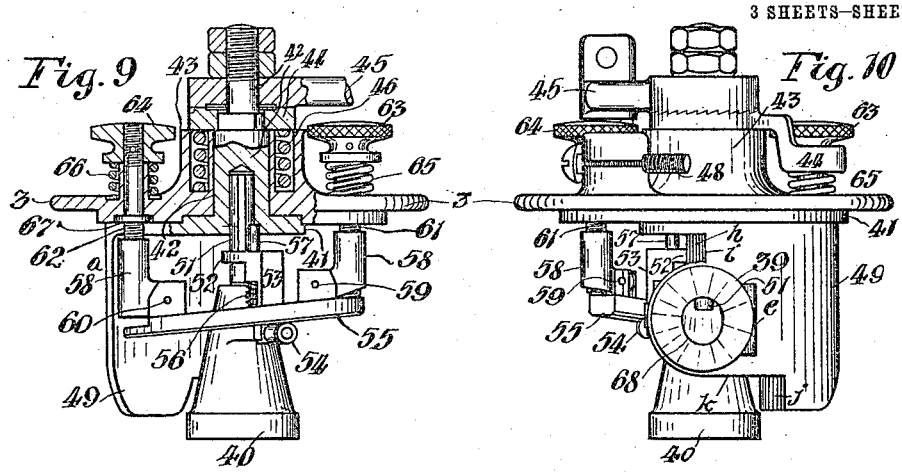
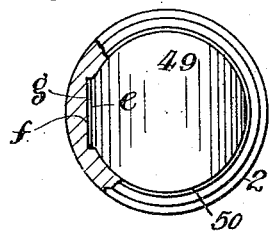
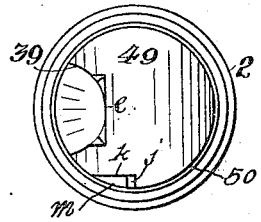
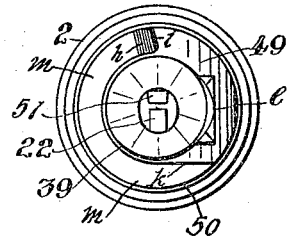
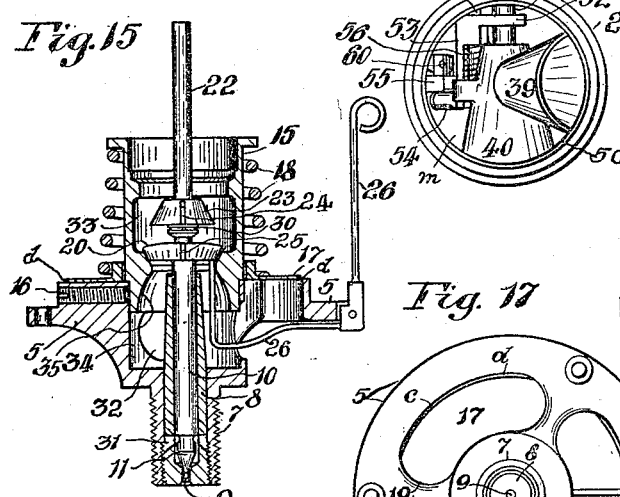
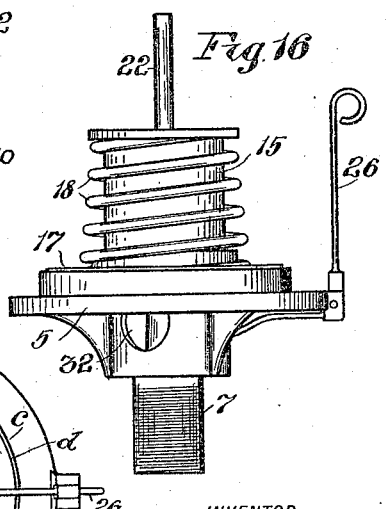
WITNESSES:
F. L. Burke
L. S. Morris
INVENTOR
Edward G. Blackert,
BY Geo. D. Phillips
his ATTORNEY
THE NORRIS PETERS CO., PHOTO-LITHO., WASHINGTON, D. C.

UNITED STATES PATENT OFFICE.

EDWARD G. BLACKERT, OF BRIDGEPORT, CONNECTICUT.

CARBURETER.

1,122,572.   Specification of Letters Patent.   Patented Dec. 29, 1914.

Application filed September 19, 1912. Serial No. 721,136.

*To all whom it may concern:*

Be it known that I, EDWARD G. BLACKERT, citizen of the United States, residing at Bridgeport, in the county of Fairfield and State of Connecticut, have invented certain new and useful Improvements in Carbureters; and I do hereby declare the following to be a full, clear, and exact description of the invention, such as will enable others skilled in the art to which it appertains to make and use the same.

My invention relates to an improvement in carbureters, and it consists in certain details of construction to be more fully set forth in the following specification, reference being had to the accompanying drawings wherein the same figures and letters of reference indicate like parts throughout the several views.

Figure 1 represents a side elevation of the carbureter: Fig. 2, an upper plan view; Fig. 3 is a broken side elevation, partly in section; Fig. 4 is an enlarged broken detail view, partly in section, of the needle valve, needle valve tube, air valve and its seat; Fig. 5 is a detail, broken inside plan view of the air strainer holding cup of the carbureter; Fig. 6 is a detail plan view of the auxiliary air valve; Fig. 7 is a side elevation of the same; Fig. 8 is a bottom plan view of the carbureter casing with the base and needle valve and air valve mechanism removed, showing the cone chambers; Fig. 9 is a detached view, partly in section, of the mechanism connected to the cap or cover of the carbureter; Fig. 10 is a full reverse view of the same; Figs. 11, 12, 13 and 14 are views of the front elevation of the outlet port of the carbureter, showing the different positions of the shut-off or throttle valve from the smallest to the largest opening; Fig. 15 is a detached view, partly in section, of the removable bottom of the carbureter casing, containing the needle valve, auxiliary air valve, and initial carbureting chamber; Fig. 16 is a side elevation in full of the removable bottom shown at Fig. 15; Fig. 17 is a detail bottom plan view of the same; and Fig. 18 is an enlarged detail upper plan view of the mechanism connected with the needle valve construction, looking in the direction of arrow *b* of Fig. 4; and Fig. 19 is an enlarged detail view of the needle valve tube and broken sectional view of its support, and needle valve stem.

The body of the casing 1 has the exteriorly threaded nipple 2 adapted to connect with an engine, and the cover 3 secured to the casing or body 1 by the screws 4.

5 is the removable bottom secured to the body by screws 6. The lower threaded extension 7 is adapted to be connected with the gasolene, or other like fluid supply (not shown.)

8, Figs. 3, 4 and 15, is a shell or tube secured within the extension 7, having the fluid intake port 9. This tube also acts as a guide for the needle valve stem 10 whose lower valve end 11 acts, in conjunction with the port 9, to regulate the flow of fluid into the carbureter.

12 is an air strainer surrounding the lower part of the body, Figs. 1 and 3, and is supported in the cup 13, which cup is secured to the base 5 by the nut 14.

15 is a shell shouldered in the upper part of the base 5, Figs. 3, 15 and 16, and is held there by the set screw 16.

17 (see also Figs. 6 and 7) is an auxiliary air valve normally held against the upper surface of the base 5 by the spring 18. The diameter of this valve is a trifle smaller than the outer curved edges *c* of the air openings 19, in the top or upper surface of the base 5, leaving the semi-circular openings or ports *d*, between the outer edge of the valve 17 and the edges *c*, for the admission of air necessary for light work.

The air valve 20 of the needle valve stem normally lies, when the engine is not running, just off its seat 21, as shown at Fig. 4; and the fluid intake port 9 will be closed by the valve 11. 22 is an extension of the needle valve stem secured to the upper end of said stem, and it carries the cone-shaped hood 23 having the radial slots 24 (see also Fig. 18). The air valve 20 is also provided with the radial slots 25, the purpose of which will be more fully explained. In starting, the primer 26 will, through its contact with the air valve 20, raise the needle valve and uncover the port 9 to admit fluid into the interior of the shell or tube 8 and through the by-pass 27 to the passage 28; thence through the narrow passage 29 of the extension 22 and out through the upper by-pass 30. 31 is a priming chamber, shown more clearly at Fig. 19, adapted to hold sufficient gasolene to insure starting the engine; it also serves to catch and retain particles of dirt that may be drawn in with the fluid gasolene, and which can be easily removed on removing the tube 8.

The air to mix with the fluid enters through the holes 32, Figs. 3, 15 and 16 of the base 5, and up by the air valve 20 into the carbureting chamber 33. The upward rush of air will wire draw by the valve and through its radial slots, and also through the radial slots of the hood 23 carrying the gasolene with it, and thus assist in breaking up and vaporizing the same.

Too much agitation of the primer will flood the carbureter, and this extra fluid must be eliminated before the carbureter can work. In such an event, the extra fluid will fall into the chamber 34 of the base 5, where it will mix with the air in said chamber, and the proportion of air and fluid will be the same as in the carbureting chamber 33 above. From the chamber 34 the mixture is wire drawn in its passage through the restricted valve seat opening and the cone-shaped opening 35 in the bottom of the shell 15 and the radial openings of the air valve 20, as before mentioned. If the carbureter is flooded to such an extent that the air in the overflow chamber 34 is not sufficient to form the proper mixture, the excess of fluid will overflow from the chamber 34 through the holes 32 of the base 5 into the recess 37, Fig. 5, of the cup 13, and, when said recess is full, will overflow therefrom to the atmosphere through the relief holes 38. It will thus be seen that it is impossible to flood the carbureter to the extent of temporarily stopping its operation until the excess of fluid has been gotten rid of, as it will automatically take care of any excess of fluid without interfering with the proper working of the carbureter. Any fluid remaining in the recess or depression 37 of the cup 13 will readily be taken up by the suction of the engine when in proper working operation.

39 and 40 are upper cone-shaped chambers located at right angles to each other and integrally connected together and to the upper rotatable plate 41, Figs. 3, 9 and 10. The hub 42 of this plate is rotatably mounted in the boss 43 of the cap 3.

44 is a stop lever having ratchet teeth in its upper surface to register with ratchet teeth in the under surface of the control lever 45 as shown, and such toothed contact is maintained by the spring 46.

47 and 48 (see also Fig. 2) are adjustable stop screws to limit the travel of the control lever.

49 is a skirt also integral with the rotatable plate 41 which serves as a shut-off or throttle valve for the outlet port 50.

51 is a vertically movable valve stop pin, operatively mounted in the plate 41 and its hub 42, for limiting the upward lift of the needle valve and regulating the intake of fluid. The vertical adjustment of this stop pin is effected through the medium of the integral arms 52 and 53, the former having a slotted end (not shown) to engage a circumferential groove (not shown) in the body of the pin. The arm 53 operates in the slideway 40$^a$ integral with the cone 40 and carries the roll 54 at its lower end to engage the under surface of the cam or incline track 55. The engagement of this roll with the incline is maintained by means of the spring 56 on the guide pin 57, which spring also lifts stop pin. The track 55, Fig. 9, is pivotally supported to the carriers 58, 58$^a$, by the pins 59, 60. The pitch of the track is regulated by the screws 61, 62, engaging threaded holes in the carriers. The screws are rotated by means of the heads 63, 64, and they are maintained in workable position by means of the springs 65, 66, and the shoulder 67 resting against the underside of the cap 3.

The lower end of the cone 40 enters the mouth of the shell 15 and is rotatably workable therein. The mixture from the chamber 30 enters the enlarged mouth of the cone 40 and is still further mixed as it is drawn into the apex of the cone and wire drawn through the small opening 68, Fig. 8, of the apex of the outlet cone 39 and is further mixed by expansion against the interior walls of said outlet cone, and by the time the mixture reaches the engine it is completely vaporized.

The mouth of the outlet cone 39, Figs. 11 and 12, is chamfered cut back into the body of the shut-off valve 49 to form the straight edge $e$, which edge is adapted to register with a similar straight edge $f$ (see also Fig. 3), formed on the interior inner portion of the outlet port 50, Fig. 11. This forms the straight and even opening or port $g$ representing the lowest amount of intake and slow running of the engine. The upper portion of the edge of the throttle valve 49, close to the mouth of the cone 39, has the outwardly inclined cut $h$ with the edge $i$ about on a line with the center of the cone. A portion of the bottom edge of the shut-off valve is cut away from the incline $j$ to the mouth of the cone forming the tangential line $k$ running close to the outer circumferential surface of the mouth of the cone. The object of this construction is to afford the required space or outlet for the admission of air necessary to form the right proportion of air and mixture for the different speeds or engine loads.

In Fig. 12 the control lever is operated to actuate the shut-off valve 49 and uncover a portion of the mouth of the cone 39 to give an increase of power over the port opening $g$ at Fig. 11. This movement, and position of the mouth of the cone with respect to the port 50, will expose the air opening m, formed by cutting away the bottom edge of the shut-off valve as before mentioned, which opening will admit the proper proportion of air for mixture drawn from the cone, and also serve to sweep the bottom of the port 50 of fluid that might lodge there. This air opening is proportionally increased as the cone is exposed to view, as shown at Fig. 13, until the extreme position is reached as shown at Fig. 14, which position represents the richest mixture obtainable for the greatest engine load. The extra air supply to unite with the mixture drawn from the cone 39 is supplied by the auxiliary valve 17.

While I show an extension to the needle valve stem detachably connected to the stem, it will be understood that the said stem and extension could, if desired, be made integral, as the principal object of said extension is to bring the needle valve into close working relation with the adjustable stop 51. This stop could, however, be extended down into the mixing chamber 33 if so desired and the extension 22 dispensed with.

What I claim is:—

1. A carbureter having a stationary tube with a fluid inlet port, a needle valve operatively mounted in the tube adapted to regulate the intake of fuel through said port, an air valve and hood carried by the needle valve stem, a stationary air port therefor, said needle valve stem having a central bore or passage, and a fluid inlet by pass near its lower end and opening into the central passage, a priming chamber in the tube near said by pass, and an upper fluid outlet by pass above the air valve.

2. A carbureter having a fluid inlet port, a vertically operating needle valve therefor having a central fluid passage, an air valve on the needle valve stem, a stationary port for the air valve, said air valve having radial slots for the passage of air, a mixing hood carried by the needle valve and movable therewith and having radial slots and located above the air valve, the needle valve having a lower inlet fluid by pass, and an upper outlet fluid by pass located between the air valve and hood.

3. A carbureter having a base, a stationary tube with a fluid inlet port located therein, a needle valve for the port and operatively located in the tube, an overflow chamber in said base having air inlet openings, an air valve carried by the needle valve stem and located above the overflow chamber, a stationary port for the valve, a carbureting chamber above the air valve, an extension of the needle valve stem carrying a hood and movable with said extension, said air valve and hood having radial slots, the needle valve having a lower fluid inlet by pass and a central passage communicating therewith, said extension having a restricted passage communicating with the central passage of the needle valve, and a fluid outlet by pass opening into the carbureting chamber and located under the hood.

4. A carbureter casing, a removable base therefor, said base having an overflow chamber and air inlet openings communicating with the chamber, a shell having internal chambers communicating with the overflow chamber, said base having air ports in its upper surface, an auxiliary air valve overlying said ports but not completely covering the same, and a spring for normally maintaining the air valve on its seat under light loads.

5. A carbureter casing, a removable base therefor, a tube connected with said base having a fluid inlet port, a needle valve operatively located in the tube, an air valve carried by the needle valve and located above the tube, an extension of the needle valve carrying a hood above the air valve, said air valve and hood having radial slots, the needle valve having a central fluid passage and an inlet fluid by pass communicating therewith, and an outlet fluid by pass below the hood, the base having a fluid overflow chamber, a carbureting chamber surrounding the air valve and hood, and an auxiliary air valve above the overflow chamber.

6. A carbureter having a fluid intake port, a valve therefor, an air valve, a carbureting chamber in which the air valve is located, a mixture outlet port, a throttle valve therefor, cone carbureting chambers carried by the throttle valve and communicating with each other at their apex, one of said cones receiving the mixture from the air valve carbureting chamber and the other discharging the mixture into the outlet port.

7. A carbureter comprising a casing having a mixture outlet port, an exteriorly operated throttle valve for said port, angularly disposed cone chambers carried by the throttle valve and having communication with each other at their apex, a fluid inlet port, a carbureting chamber above the inlet port communicating with one of the cone chambers, the mixture passing through the cone chambers to the outlet port.

8. A carbureter comprising a casing having a mixture outlet port and a fluid intake port, a needle valve for the intake port, an air valve and chamber above the intake port, an exteriorly operated throttle valve for the outlet port, angularly disposed cone chambers communicating with each other at their apex and carried by the throttle valve, one of said cone chambers opening into the carbureting chamber, the other opening into the outlet port, an extension on the needle valve, an automatically adjustable stop for said extension associated with the throttle valve, an incline track associated with the stop and throttle valve and means located outside of the carbureter casing to adjust the pitch of the track and thus regulate and adjust the stop with respect to the needle valve extension.

9. A carbureter casing having a fluid intake port, a valve therefor, a mixture outlet port, a rotatable throttle valve for said outlet port, cone chambers carried by the throttle valve and angularly arranged with respect to each other, the open mouth of one of the cones adapted to receive the mixture above the intake valve, which mixture is adapted to pass out of the other or outlet cone into the mixture outlet, an adjusting stop for regulating the opening of the fluid intake port, an incline track, means connecting the stop with the track, means outside the casing for adjusting the track, and a control lever outside the casing for simultaneously operating the throttle valve to regulate the outflow of the mixture and air and also the position of the stop.

10. A carbureter casing having a mixture outlet port, a rotatable throttle valve therefor, an outside control lever for the valve, hollow cone chambers carried by the valve and united at their apex, a fluid inlet port and a valve therefor, the mouth of one of the cones adapted to receive the mixture above the inlet port, the mouth of the other cone adapted to open into the outlet mixing port, the throttle valve so formed with respect to the outlet mixing port and the mouth of the cone connected therewith that the proper proportion of air and mixture is admitted to the outlet mixture port for each position of the control lever.

In testimony whereof I affix my signature in presence of two witnesses.

EDWARD G. BLACKERT.

Witnesses:
Geo. D. Phillips,
James Feeley.

Copies of this patent may be obtained for five cents each, by addressing the "Commissioner of Patents, Washington, D. C."